T. WILSON.
MACHINE FOR WASHING BEANS, &c.
APPLICATION FILED JULY 21, 1913.
1,109,728.
Patented Sept. 8, 1914.
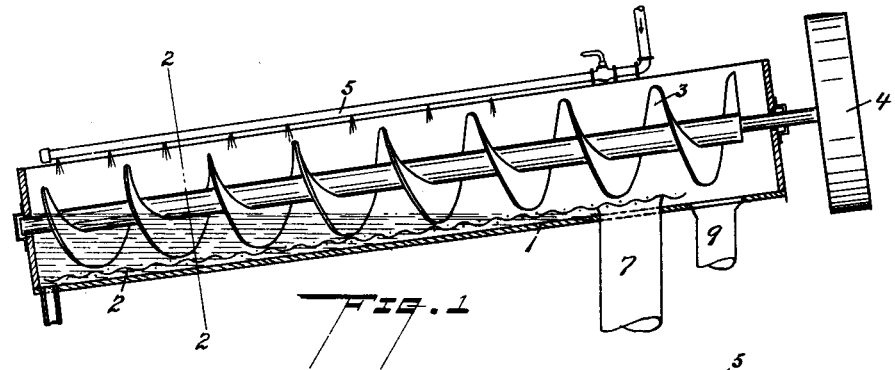
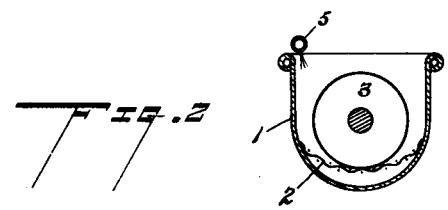
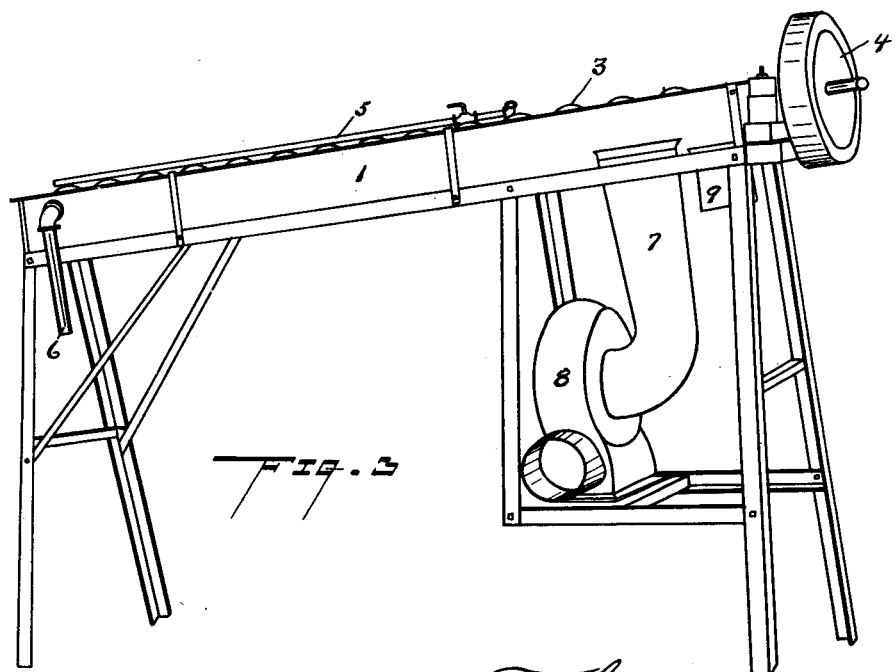
WITNESSES:
Thomas Wilson INVENTOR
BY
Geo. B. Willcox ATTORNEY

UNITED STATES PATENT OFFICE.

THOMAS WILSON, OF MARLETTE, MICHIGAN.

MACHINE FOR WASHING BEANS, &c.

1,109,728.     Specification of Letters Patent.     Patented Sept. 8, 1914.

Application filed July 21, 1913. Serial No. 780,337.

*To all whom it may concern:*

Be it known that I, THOMAS WILSON, a citizen of the United States, residing at Marlette, in the county of Sanilac and State of Michigan, have invented certain new and useful Improvements in Machines for Washing Beans, &c.; and I do hereby declare the following to be a full, clear, and exact description of the invention, such as will enable others skilled in the art to which it appertains to make and use the same.

This invention is a machine for washing and draining beans, peas and similar articles and the improvement relates more particularly to the combination of devices whereby the beans are first washed by being agitated in a body of water, and then washed by a shower or spray, the material being then conveyed along a draining screen and subjected to the drying action of a current of air produced by an exhaust fan. The cleaned material is then delivered through a discharge spout.

The objects of my invention are to thoroughly wash, spray, drain and partially dry the material at one passage through the machine.

With this and certain other objects in view which will appear later in the specifications, my improvement consists in the devices described and claimed and the equivalents thereof.

In the drawing, Figure 1 is a part vertical section taken lengthwise through the machine; Fig. 2 is a cross section of the trough on line 2—2 of Fig. 1; Fig. 3 is a side perspective view of the assembled machine.

As is clearly shown in the drawings, the device consists in a trough 1, near the bottom of which is located a removable screen 2 of sufficiently fine mesh to permit the material to be conveyed along the surface of the screen while permitting the water and dirt to pass through. A screw conveyer 3 is mounted in the trough so that its lower periphery is sufficiently close to the screen 2 to permit the conveyer to move the material along the screen. The conveyer is driven by a suitable pulley 4. Along the upper edge of one side of the conveyer trough is a perforated spray pipe 5 arranged to deliver a shower of water into the trough at one side of the conveyer 3.

The trough is arranged with its delivery end higher than the receiving end, the lower end being filled with water, as shown in Fig. 1.

The material to be washed is delivered into the water at the lower end of the machine, where it is thoroughly agitated and gradually forced toward the delivery end of the trough by the rotating screw conveyer. The material tends to lift up out of the water along the upwardly moving periphery of the screw conveyer, on the side of the trough at which spray pipe 5 is located, and it is thus thoroughly washed by the shower of water from pipe 5 during its upward passage along the screen 2.

The screw conveyer traverses the material upward along the screen and out of the water, where it drains and then passes over the screen at the upper end of an air suction pipe 7 from which the air is drawn by an exhauster 8. The suction of the air through the screen draws off most of the remaining surface moisture from the material, which then passes on and is discharged through a suitable outlet 9 at the upper end of screen 2.

By the means above described I have produced a washing machine of simple construction, having no parts that are liable to get out of order, and capable of rapidly washing, spraying, draining, and air-drying large quantities of material in a comparatively short time.

Having described my invention, what I claim and desire to secure by Letters Patent is as follows:

In a machine for washing beans, the combination with an inclined delivery trough having a screw conveyer mounted therein, of a removable screen arranged in said delivery trough adjacent the lower periphery of said screw conveyer adapted to span said delivery trough to form an auxiliary removable bottom therefor, a spray pipe adapted to discharge water into said trough and partly submerge said screen, a suction pipe communicating with said trough beneath the upper submerged part of the removable screen, and a discharge pipe communicating with said trough adjacent the upper end of said removable screen.

In testimony whereof, I affix my signature in presence of two witnesses.

THOMAS WILSON.

Witnesses:
 Roy Bricker,
 Geo. B. Willcox.